H. B. SAWYER.
SAFETY TROLLEY FINDER.
APPLICATION FILED JULY 20, 1917.
1,341,284.
Patented May 25, 1920.
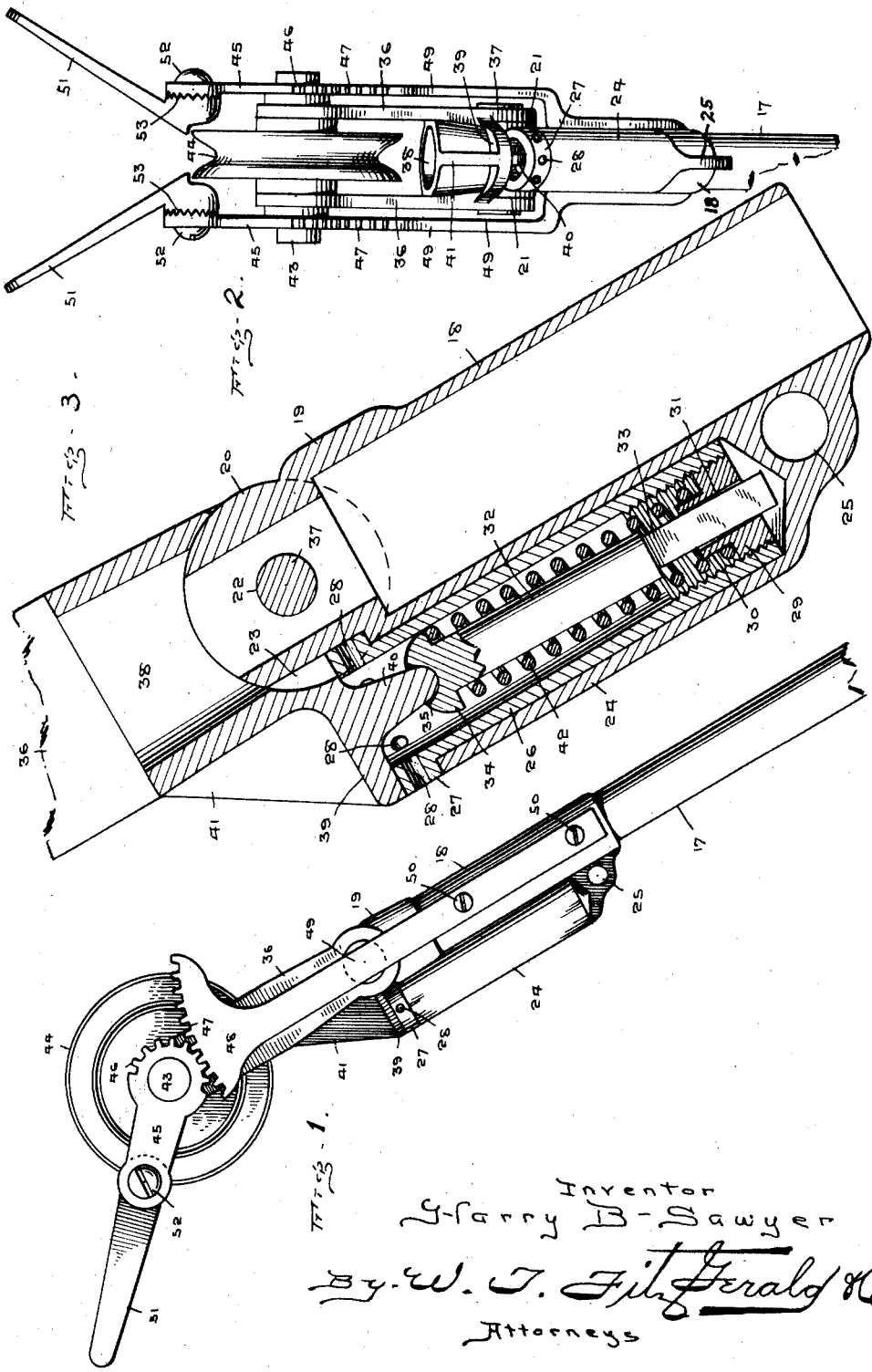

UNITED STATES PATENT OFFICE.

HARRY B. SAWYER, OF OGDEN, UTAH.

SAFETY TROLLEY-FINDER.

1,341,284.      Specification of Letters Patent.      Patented May 25, 1920.

Application filed July 20, 1917. Serial No. 181,879.

*To all whom it may concern:*

Be it known that I, HARRY B. SAWYER, a citizen of the United States, residing at Ogden, in the county of Weber and State of Utah, have invented certain new and useful Improvements in Safety Trolley-Finders; and I do hereby declare the following to be a full, clear, and exact description of the invention, such as will enable others skilled in the art to which it appertains to make and use the same.

This invention relates to new and useful improvements in trolley finders and has for its primary object to provide one embodying a pair of guide fingers which normally rest in a substantially horizontal plane below that of the trolley wire and which are adapted to swing upwardly into a substantially vertical position on opposite sides of the wire when the trolley wheel leaves the wire to quickly and effectively guide the wheel back into engagement with the wire.

Another object of the invention is to pivotally and adjustably mount the guide fingers so that their relative position with respect to the trolley harp and the trolley wire may be varied at will.

A further object of the invention is to provide a trolley wheel section hingedly connected to the trolley pole which is adapted to rest in longitudinal alinement with the pole, when the trolley wheel is engaged with the trolley wire, under the influence of the pole supporting spring, a tension spring being employed to swing the trolley wheel section upwardly as the wheel disengages from the wire to actuate the guide fingers and move them to an operative position.

A still further object of the invention is to provide means for varying the tension of the trolley wheel section actuating spring whereby the guide fingers may be caused to swing from an inoperative position to an operative position in a more or less quick manner so that the guide fingers may be positively in position to effectively guide the trolley wheel back to the trolley wire.

With these and other objects in view as will appear as the description proceeds, the invention comprises the various novel features of construction, combination and arrangement of parts as will be more fully described hereinafter and set forth with particularity in the appended claims.

Referring to the drawings:

Figure 1 is the side elevation of my improved construction of trolley finders showing the guide fingers arranged in inoperative position.

Fig. 2 is an end view thereof showing the guide fingers arranged in operative position, and Fig. 3 is an enlarged vertical longitudinal sectional view through the trolley harp showing the tensioned actuating spring for the guide fingers.

The reference numeral 17 represents the trolley pole to the upper end of which is attached the trolley harp proper and which is shown to embody a cylindrical body member 18 that is mounted on the upper end of the trolley pole and is reinforced at its upper end as is indicated by the numeral 19. This upper end of the body member is provided with a head 20 having oppositely disposed parallel faces 21, as clearly indicated in Fig. 2, and which is provided centrally with a pivotal opening 22 extending therethrough. The outer edge of the head 20 is curved concentrically with the central pivotal opening 22 and has a portion of its edge cut away as indicated by the numeral 23.

The body member 18 is also provided at one side with a barrel 24 between the bottom of which and the body member 18 is positioned an apertured rib 25 to which a rope or cable may be attached for lowering the trolley pole. An adjusting sleeve 26 is rotatably positioned within the barrel and is provided at its upper end with a laterally extending flange 27 and is provided circumferentially with a plurality of radially extending openings 28 adapted to receive a suitable instrument to rotate the sleeve in its adjustment, and as shown the flange is adapted to rest upon the upper edge of the barrel and within the cut away portion 23 of the head 20.

The lower end of the sleeve 26 is internally threaded for the reception of a nut 29 and is provided centrally with an upstanding collar 30 and through which extends a non circular opening 31.

A bolt 32 is positioned within the sleeve and is provided with a non circular lower end 33 which rests within the corresponding opening 31 of the nut 29 and serves to prevent the latter from rotating. The upper end of the bolt is provided with a head 34, having in its upper end an elongated socket 35, the bottom of which is concaved. The opposite side walls of the socket 35 are parallel so as to form preferably a rectangular concaved socket.

The numeral 36 represents a pair of supporting arms that have their lower ends pivotally connected to the head 20 through the medium of a pivotal stud 37 disposed through the opening 22. A tubular member 38 is positioned between and adjacent the lower ends of the supporting arms and is integral therewith. This tubular member 38 is provided at its lower edge with a laterally projecting flange 39 that is adapted to normally rest upon the flange 27 of the adjustable sleeve 26, and this flange 39 is provided with a depending flat tongue 40, the lower end of which is rounded and rests within the rectangular concaved socket 35 and serves to prevent the bolt 32 from rotating when the sleeve 26 is turned for adjusting the nut 29. This flange 39 is reinforced and braced by a rib 41. The expansion coil spring 42 is positioned around the bolt 32 and between the nut 29 and the bolt head 34 and serves to hold the head of the bolt in engagement with the tongue 40.

A trolley wheel axle 43 is journaled in the upper ends of the supporting arms 36 and rotatably mounted thereon between the arms 36 is a trolley wheel 44. A rack arm 45 is mounted rigidly on each outer end of the axle and is provided concentrically of the axle with rack teeth 46 which mesh with rack teeth 47 carried by the head 48 of the adjacent rack bar 49. Each of the rack bars 49 is rigidly secured on opposite sides of the body member 18 by screws or other suitable fastening means 50.

Each of the rack arms 45 has pivotally and adjustably connected to its outer end a guide finger 51 through the medium of an adjusting screw 54. The coengaging faces of the guide fingers and the rack arms are provided with teeth or serrations 53 whereby the guide fingers may be held in any desired angular relation with respect to the rack arms. As shown the guide fingers converge inwardly to the trolley wheel 44 so that they will effectively serve to guide the trolley wire into engagement with the wheel.

From the foregoing description it will be apparent that when the trolley wheel leaves the trolley wire and the trolley pole moves downwardly, the expansive force of the spring 42 will be utilized to swing the supporting arms 36 upwardly on the pivotal stud 37, the upward movement of the supporting arms causing the teeth 46 to ride over the teeth 47 of the rack bars 49 and thereby swing the guide fingers from an inoperative to an operative position on opposite sides of the trolley wire.

It is also to be noted that by the adjusting means for varying the tension of the spring 42 that the rapidity of the movement of the swinging guide fingers 51 can be regulated in proportion to the tension of the pole supporting spring. For instance if the pole supporting spring was comparatively weak, the movement of the trolley wheel back into engagement with the trolley wire, when once it had become disengaged, would be comparatively slow, and therefore it would not be necessary to have the guide fingers swing upwardly with any great amount of rapidity into operative position on opposite sides of the trolley wire for quickly and effectively guiding the trolley wheel back into engagement with the trolley wire. Where as on the other hand if the pole supporting spring were comparatively stiff or high tensioned, it would be necessary to have the guide fingers swing upwardly to an operative position very quickly, and to provide for this rapid actuation of the guide fingers, the adjusting sleeve 26 is rotated so as to increase the tension upon the spring 42 which in turn will cause the supporting arms to swing upwardly more quickly and consequently actuate the guide fingers in a like rapid manner so as to be disposed in an operative position ready to guide the trolley wheel back into engagement with the wire.

By the particular construction of the tensioning means for the spring 42 it will be apparent that as the sleeve 26 is revolved that the nut 29 will move longitudinally therein and thus compress the spring between it and the bolt head 34. By the provision of the concaved socket 35, the flat tongue 40 is enabled to have a slight relative movement with respect to the bolt head as the flange 39 and its respective tongue 40 swing concentrically with the pivotal stud 37 in the actuation of the movement of the arms 36.

From the foregoing description taken in connection with the accompanying drawings, the advantages of construction and the method of operation will be readily apparent to those skilled in the art to which the invention relates, and while I have described the principle of operation of the invention, together with the device which I now consider to be the best embodiment thereof, I desire to have it understood that such changes in construction and arrangement of parts may be made when described as are within the scope of the appended claims.

I claim:—

1. The combination with a trolley pole member, a head pivoted to the upper end of said member and provided with a lateral projection, a barrel carried by said body member, a sleeve rotatably mounted within said barrel and internally threaded, a guide nut threaded within said sleeve, a bolt disposed within the sleeve to engage said lateral projection and having its lower end passing through said nut, said nut and bolt fitting together so as to prevent relative rotation, and a tension spring disposed between said bolt and nut.

2. The combination with a trolley pole, of supporting arms pivoted thereto at their lower ends and provided with a lateral projection, a rotatable sleeve, means supporting the sleeve from said pole beneath said projection, a guide nut having an angular aperture and threaded into said sleeve, a sliding bolt engaging said lateral extension and having an angular lower end passing through said nut, and a tension spring extending between the head of said bolt and said nut.

3. In a trolley finder of the class described, the combination with a trolley pole, of a body member mounted on said trolley pole, a head carried by the upper end of said body member, a barrel carried by said body member, a sleeve rotatably mounted within said barrel and internally threaded at its lower end, a nut threaded within said sleeve and provided with a non circular opening, a bolt having a non circular lower end disposed within said sleeve and through said nut, and an expansion spring disposed around the bolt between its head and said nut, the head of said bolt being provided with a socket, a pair of supporting arms hingedly connected to said head and integrally connected with each other, a flange projecting laterally from said arms and provided with a depending flat tongue, the lower end of said tongue resting within said bolt head socket, and a lateral flange carried by the upper end of said sleeve and provided circumferentially with radially extending openings whereby the sleeve may be rotated for adjusting the tension of said spring.

In testimony whereof I have signed my name to this specification in the presence of two subscribing witnesses.

HARRY B. SAWYER.

Witnesses:
 PAUL M. LEE,
 A. V. McINTOSH.